(12) United States Patent
Guengoer et al.

(10) Patent No.: US 12,044,198 B2
(45) Date of Patent: Jul. 23, 2024

(54) FLUID DISTRIBUTOR FOR AN INJECTION SYSTEM, IN PARTICULAR, FUEL DISTRIBUTOR RAIL FOR A FUEL INJECTION SYSTEM FOR MIXTURE-COMPRESSING, SPARK IGNITION INTERNAL COMBUSTION ENGINES

(71) Applicant: Robert Bosch GmbH, Stuttgart (DE)

(72) Inventors: Goekhan Guengoer, Hemmingen (DE); Martin Haug, Weil der Stadt (DE); Prashant Kaswekar, Stuttgart (DE); Ralf Weber, Bretten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/787,652

(22) PCT Filed: Nov. 17, 2020

(86) PCT No.: PCT/EP2020/082358
§ 371 (c)(1),
(2) Date: Oct. 19, 2022

(87) PCT Pub. No.: WO2021/121826
PCT Pub. Date: Jun. 24, 2021

(65) Prior Publication Data
US 2023/0008682 A1 Jan. 12, 2023

(30) Foreign Application Priority Data
Dec. 20, 2019 (DE) ..................... 10 2019 220 377.9

(51) Int. Cl.
*F02M 69/46* (2006.01)
*F02M 55/02* (2006.01)
(Continued)

(52) U.S. Cl.
CPC ........ *F02M 69/465* (2013.01); *F02M 55/025* (2013.01); *F02M 61/14* (2013.01); *F02M 61/166* (2013.01); *F02M 61/168* (2013.01)

(58) Field of Classification Search
CPC .... F02M 69/465; F02M 55/025; F02M 61/14; F02M 61/166; F02M 61/168
(Continued)

(56) References Cited

U.S. PATENT DOCUMENTS 4,996,961 A * 3/1991 Usui .................... F02M 69/465
                                                    123/456
5,735,247 A * 4/1998 Tsuzuki ............... F02M 51/005
                                                    123/456
(Continued)

FOREIGN PATENT DOCUMENTS

DE    102008044923 A1    3/2010
EP            132418 A * 1/1985 .............. B23P 13/00
(Continued)

OTHER PUBLICATIONS

International Search Report for PCT/EP2020/082358 Issued Feb. 17, 2021.

*Primary Examiner* — Sizo B Vilakazi
*Assistant Examiner* — Brian R Kirby
(74) *Attorney, Agent, or Firm* — NORTON ROSE FULBRIGHT US LLP; Gerard A. Messina

(57) ABSTRACT

A fluid distributor for an injection system, in particular a fuel distributor rail for a fuel injection system for mixture-compressing, spark ignition internal combustion engines. The fuel distributor includes a tubular base body, which is preferably processed by a one-stage or multi-stage forging process, a first high-pressure output, a second high-pressure output, a third high-pressure output, and a fourth high-pressure output being provided at the base body. The second high-pressure output is situated offset by a predefined dis- (Continued)

tance compared to the first high-pressure output in a first direction along a longitudinal axis of the tubular base body. The third high-pressure output is situated offset by the predefined distance compared to the second high-pressure output along the longitudinal axis in the first direction, the fourth high-pressure output being situated offset by the predefined distance compared to the third high-pressure output along the longitudinal axis in the first direction.

13 Claims, 3 Drawing Sheets

(51) Int. Cl.
    *F02M 61/14*     (2006.01)
    *F02M 61/16*     (2006.01)

(58) Field of Classification Search
    USPC .......................................................... 123/456
    See application file for complete search history.

(56) References Cited

U.S. PATENT DOCUMENTS

| | | | |
|---|---|---|---|
| 6,644,279 B1* | 11/2003 | Frank | F02M 55/025 |
| | | | 123/456 |
| 6,732,711 B2* | 5/2004 | Yanagii | F02M 55/025 |
| | | | 123/456 |
| 6,742,504 B2* | 6/2004 | Seymour, II | F02M 63/0225 |
| | | | 123/456 |
| 7,143,749 B1* | 12/2006 | Colletti | F02M 69/465 |
| | | | 123/469 |
| 7,942,136 B2* | 5/2011 | Lepsch | F02M 55/025 |
| | | | 123/549 |
| 9,062,640 B2* | 6/2015 | Yamamoto | F02M 61/14 |
| 10,138,854 B2* | 11/2018 | Schultz | F02M 63/0225 |
| 11,274,642 B1* | 3/2022 | Stewart | F02M 51/005 |
| 2007/0169751 A1* | 7/2007 | Tominaga | F02M 55/04 |
| | | | 123/456 |
| 2011/0073074 A1* | 3/2011 | Hay | F02M 55/025 |
| | | | 123/193.5 |
| 2011/0108005 A1* | 5/2011 | Nishizawa | B23K 1/0008 |
| | | | 228/159 |
| 2011/0265766 A1* | 11/2011 | Niwa | F02M 69/465 |
| | | | 123/468 |
| 2013/0036607 A1* | 2/2013 | Takasaki | F02M 55/025 |
| | | | 29/888.01 |
| 2013/0068198 A1* | 3/2013 | Maier | F02M 55/025 |
| | | | 123/456 |
| 2013/0312705 A1* | 11/2013 | Isogai | B21D 53/84 |
| | | | 123/445 |
| 2014/0123949 A1* | 5/2014 | Isogai | F02M 55/025 |
| | | | 123/456 |
| 2014/0199480 A1* | 7/2014 | Isogai | C23C 18/54 |
| | | | 205/198 |
| 2014/0305411 A1* | 10/2014 | Ikoma | F02M 61/14 |
| | | | 123/470 |
| 2015/0047613 A1* | 2/2015 | Jensen | F02M 63/0275 |
| | | | 123/456 |
| 2015/0198128 A1* | 7/2015 | Mechi | F02M 61/14 |
| | | | 123/456 |
| 2015/0204295 A1 | 7/2015 | Wiedmann et al. | |
| 2017/0130686 A1* | 5/2017 | Schultz | F02M 69/465 |
| 2017/0218903 A1* | 8/2017 | Kambakhsh | F02M 55/025 |
| 2017/0260945 A1* | 9/2017 | Soma | F02M 55/025 |
| 2019/0093613 A1* | 3/2019 | Horstmann | F02M 55/005 |
| 2021/0087659 A1* | 3/2021 | Moxlow | C22C 38/04 |

FOREIGN PATENT DOCUMENTS

| | | | | |
|---|---|---|---|---|
| EP | 0536091 A1 | | 4/1993 | |
| JP | H04124462 A | | 4/1992 | |
| JP | H0640924 Y2 | | 10/1994 | |
| JP | 2012052452 A | | 3/2012 | |
| JP | 2013083164 A | * | 5/2013 | |
| JP | 2014109245 A | | 6/2014 | |
| JP | 2018158372 A | | 10/2018 | |
| WO | WO-2006100140 A1 | * | 9/2006 | ........... F02M 55/005 |
| WO | 2013189637 A1 | | 12/2013 | |

* cited by examiner

FLUID DISTRIBUTOR FOR AN INJECTION SYSTEM, IN PARTICULAR, FUEL DISTRIBUTOR RAIL FOR A FUEL INJECTION SYSTEM FOR MIXTURE-COMPRESSING, SPARK IGNITION INTERNAL COMBUSTION ENGINES

FIELD

The present invention relates to a fluid distributor for an injection system, in particular, a fuel distributor rail for a fuel injection system for mixture-compressing, spark ignition internal combustion engines, and to an injection system. Specifically, the present invention relates to the field of fuel injection systems used for mixture-compressing, spark ignition internal combustion engines, the fuel distributor rail, for example, being situated in an engine compartment of a motor vehicle, attached at a cylinder head of the internal combustion engine, and being used, during operation, to inject fuel directly into combustion chambers of the internal combustion engine.

BACKGROUND INFORMATION

The abstract and the figures of Japan Patent Application No. JP 2018-158372 A, describes and shows manufacturing a base body for a distributor rail with the aid of forging. In the process, the material is eccentrically forged so that five connecting elements, which are drilled after forging, and also three holding elements, which are also still drilled after forging, are formed at the forged base body by the forging process.

In the case of a base body for a distributor rail which is manufactured corresponding to the method described and shown in the abstract and the figures of Japan Patent Application No. JP 2018-158372 A, the fastening elements configured at the base body by the forging process and subsequently drilled have a high strength, so that the entire distributor rail may be reliably mounted and attached using suitable attachment parts, for example at a cylinder head in an engine compartment.

SUMMARY

A fluid distributor according to the present invention and the injection system according to the present invention may have the advantage that an improved design and functionality are made possible. In particular, a direct connection of valves at the high-pressure outputs may be made possible.

The measures disclosed herein allow advantageous refinements of the basic fluid distributor and the basic injection system of the present invention.

The described injection system according to the present invention may, in particular, be designed as a fuel injection system, which is used to inject a fuel or a mixture with at least one fuel. Furthermore, an injection system may not only be used for liquid fluids, but possibly also allow gaseous fluids, in particular, combustible gases, to be injected.

Advantageously, according to an example embodiment of the present invention, the fluid distributor may be attached via exactly three holding elements at a suitable body, which is possible directly, or also indirectly, for example with the aid of a suitable holding structure. When the injection system is, for example, configured as a fuel injection system for motor vehicles, in general the requirement exists to attach the injection system in the engine compartment, in particular at a cylinder head, with high loads occurring. The term "holding element" here thus denotes the elements of the fluid distributor, which are accordingly loadable and at which the at least indirect attachment of the fluid distributor at a suitable body, in particular, a cylinder head, takes place.

In this way, a distinction may be made between a (high-strength) holding element and, if provided, at least one fastening element used only for low loads, which is used, for example, for fastening a car wiring harness. In general, the holding elements must withstand very high loads. When the holding elements are designed to be forged at the tubular base body, as is preferred, in general a considerable material use must be taken into consideration for this purpose.

However, it is also possible that a soldered design is implemented, in which the holding elements are joined to the tubular base body by soldering.

According to an example embodiment of the present invention, in the case of a forged design, the material for manufacturing the tubular base body, and preferably also the forged-on holding elements and high-pressure outputs, is, for example, cut to length from a round stock. The material amount then results with a certain tolerance. The material cut to length is inserted into a press, which may be made up of a die lower half and a die upper half. In the process, the die halves specify a contour for the forging process, which defines the forged shape of the base body. It must also be possible to fill the contour 100% at the lower tolerance end. Since the contour for the base body varies locally and, for example, may provide eccentricities or a local increased need for material, in general a locally varying amount of the material results, which is displaced between the die halves into a gap used to accommodate displaced material. In this way, the forged contour may be achieved in a controlled manner in one or multiple forging stage(s). In the process, a use of high-quality materials, in particular, high-quality steels, is advantageous. Preferably, a stainless steel is used for configuring the base body, the high-pressure outputs and the holding elements, a one-piece configuration preferably taking place by forging.

According to an example embodiment of the present invention, during operation, the holding elements of the fluid distributor counteract the reaction forces of the valves arising due to the hydraulic pressure and may, in this way, advantageously avoid a deflection of the tubular base body; specifically, the valves being supported at a cylinder head may cause reaction forces which are directed from the cylinder head to the fluid distributor. In this way, movements of the valves relative to the high-pressure outputs are reduced. This, in turn, reduces the loads which act on seals between the valves and the high-pressure outputs. In particular, a wear of sealing rings or the like is prevented. On the other hand, it is necessary for the fluid distributor to be supported well on a cylinder head, for example not to overload screws which fix the tubular base body of the fluid distributor at the cylinder head.

As a result of a provided design, it may, in particular, be achieved that these requirements may be fulfilled in the case of four high-pressure outputs using only three holding elements. In the process, the arrangement of the holding elements at the tubular base body is essential. In particular, the arrangement of the holding elements at the tubular base body also influences the natural frequency of the fluid distributor and, under vibration loads, the holding elements and the attachment in this regard must reliably hold the fluid distributor in position on, for example, a cylinder head.

Advantageous orientations or arrangements are possible. The holding elements are preferably situated as close as possible to the longitudinal axis of the tubular base body.

Due to an advantageous embodiment, a further optimization is possible. In particular, in this way a comparable loading at seals, in particular, O-rings, at the individual high-pressure outputs may be achieved to prevent an overload of one of these seals. The positioning of the holding elements as a function of given boundary conditions, in particular, geometric parameters, may advantageously be determined in the process with the aid of a simulation. An essential parameter in the process is the predefined distance, which is predefined, for example, by a cylinder distance in the case of an internal combustion engine including four cylinders. Particularly advantageous arrangements of the holding elements may be implemented as disclosed herein. One advantageous embodiment of the fluid distributor, in which, in particular, a one-piece design takes place by forging. Another advantageous embodiment is particularly suitable for gasoline engines or for the injection of gasoline and gasoline mixtures.

In one possible example embodiment of the present invention, the high-pressure outputs are designed as radial high-pressure outputs at the tubular base body. The tubular base body is preferably formed of a corrosion-resistant stainless steel, in particular, of a stainless steel having the material number 1.4301, 1.4307, 1.4462 or 1.4362.

BRIEF DESCRIPTION OF THE DRAWINGS

Preferred exemplary embodiments of the present invention are described in greater detail in the following description with reference to the figures, in which corresponding elements are provided with concurring reference numerals.

DETAILED DESCRIPTION OF EXAMPLE EMBODIMENTS

Figure 1:
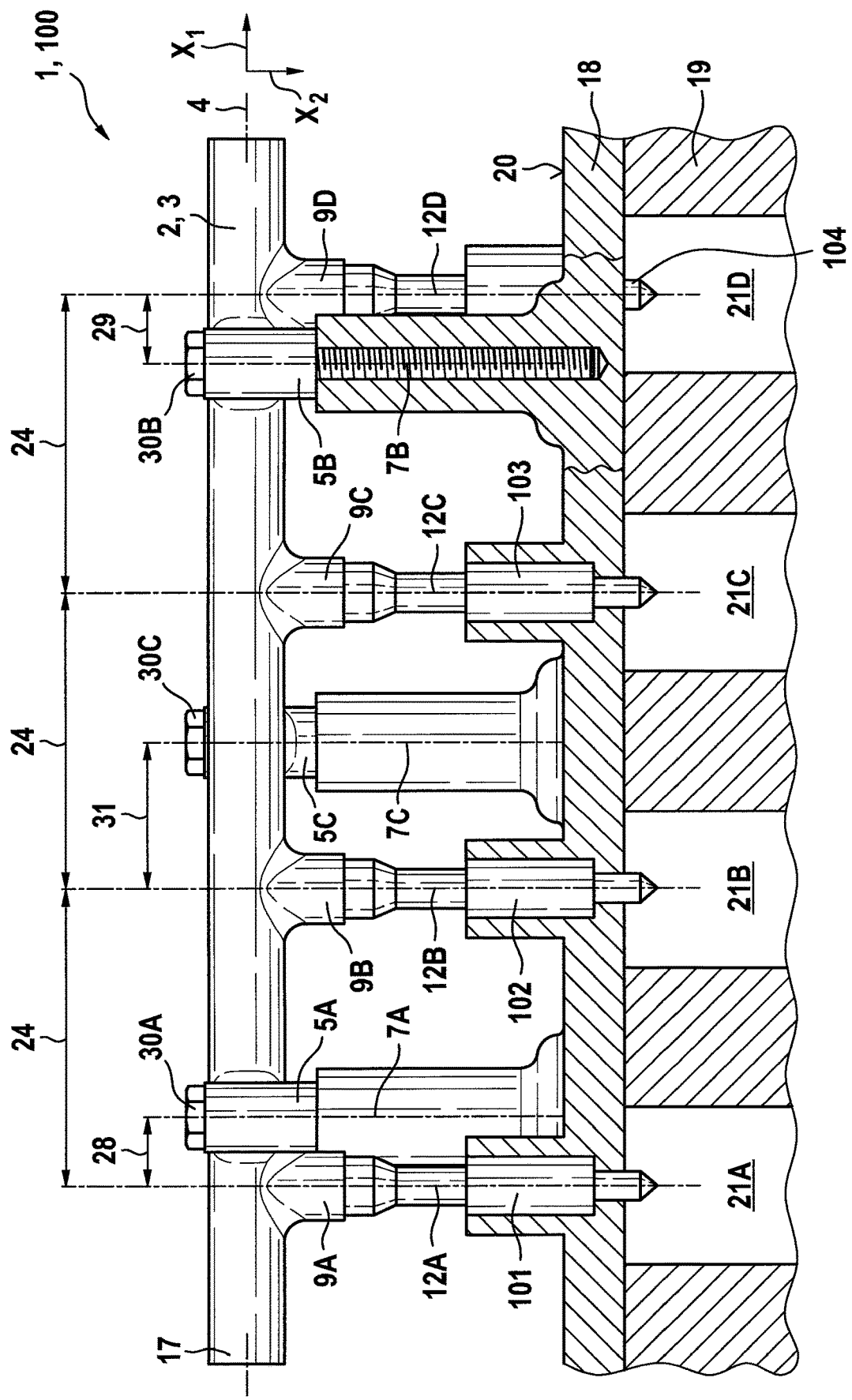
FIG. 1 shows an injection system, designed as a fuel injection system, including a fluid distributor designed as a fuel distributor rail in an excerpted, schematic representation corresponding to one exemplary embodiment of the present invention.

Based on the figures, possible example embodiments of an injection system 100 and of a fluid distributor 1 for an injection system 100 are described. Specifically, such a fluid distributor 1 may be designed as a fuel distributor rail 1 and be used for a fuel injection system 100, in which a fluid is divided among preferably multiple valves (injectors) 101 through 104, in particular fuel injectors 101 through 104. In the process, fluid distributor 1 is preferably designed in such a way that a very high loading capacity with respect to a pressure of the fluid exists, which is stored within fluid distributor 1 and, for example, is distributed among fuel injectors 101 through 104. Fluid distributor 1 is preferably implemented as a forged fluid distributor 1 so that high loads with respect to the pressure of the fluid are possible. For this reason, a fluid distributor 1 is considered here, whose tubular base body 2 is forged. It is also conceivable that fluid distributor 1 also includes at least one further component, which is screwed to base body 2 or, for example, is joined by welding or soldering.

Figure 2:
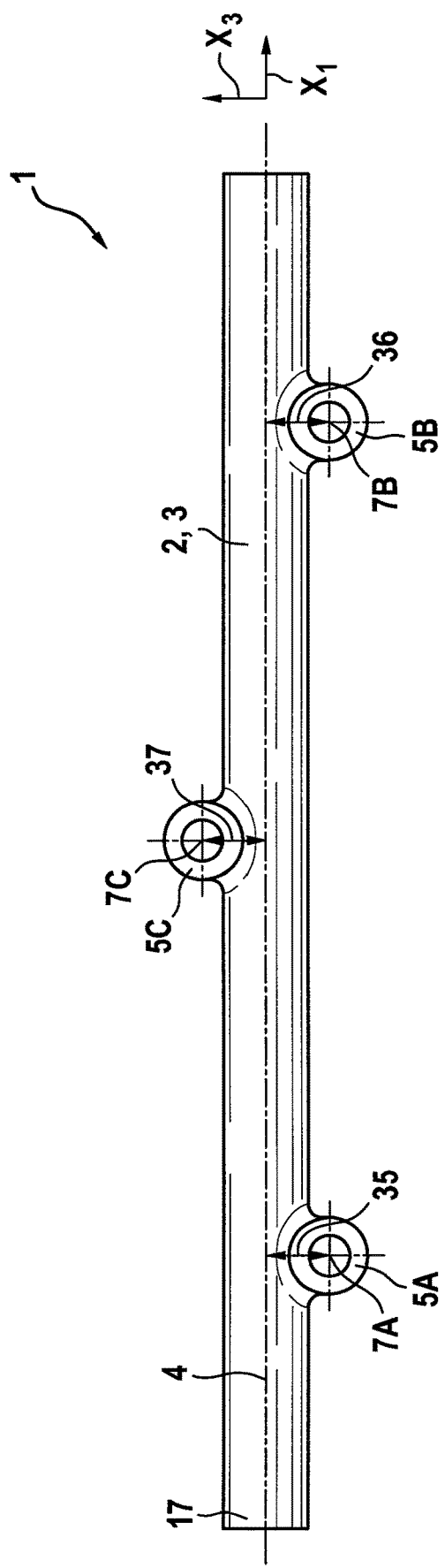
FIG. 2 shows the fluid distributor shown in FIG. 1 in an excerpted, schematic representation in the viewing direction denoted by $X_2$ corresponding to the exemplary embodiment of the present invention.
Figure 3:
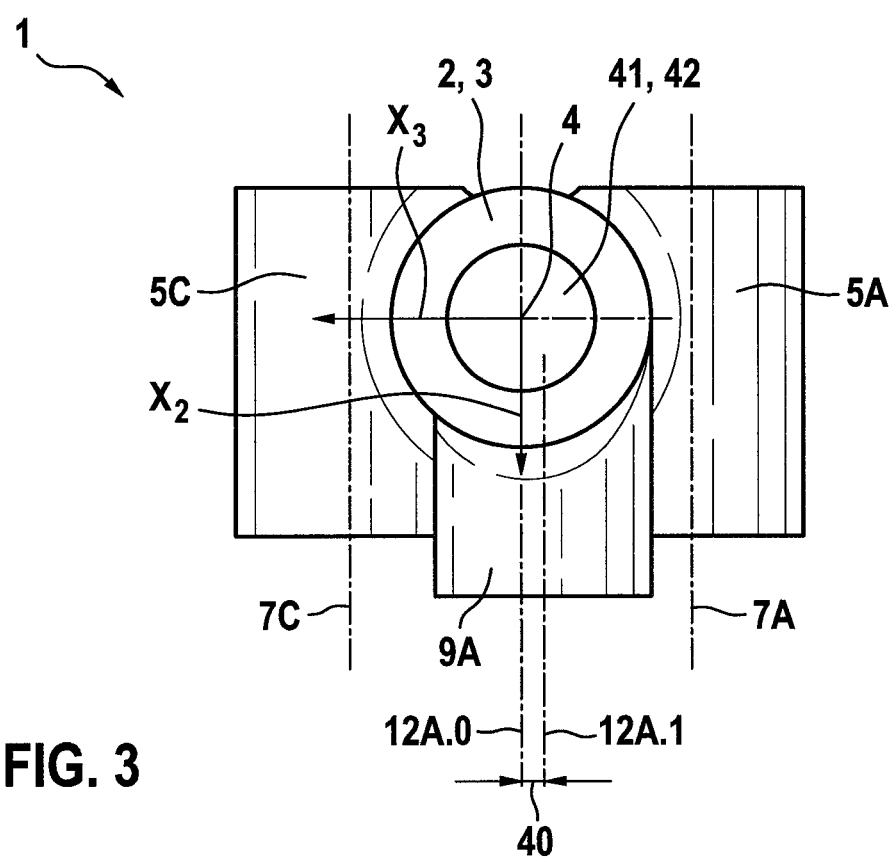
FIG. 3 shows the fluid distributor shown in FIG. 1 corresponding to a modified embodiment from the viewing direction denoted by $X_1$.

FIG. 1 shows an injection system 100, designed as a fuel injection system 100, including a fluid distributor 1 designed as a fuel distributor rail 1 in a schematic representation corresponding to one exemplary embodiment of the present invention. FIG. 2 shows fluid distributor 1 from the viewing direction denoted by $X_2$ in FIG. 1. For the forging, the desired shape of base body 2 may be predefined in a complex manner. In this exemplary embodiment, tubular base body 2 includes a tubular part 3, which is also provided with a longitudinal borehole 42 along a longitudinal axis 4 for forming an interior space 41, as is shown in FIG. 3. Base body 2 furthermore includes holding elements 5A, 5B, 5C, which are forged as eccentricities here. Axes 7A, 7B, 7C of holding elements 5A, 5B, 5C are spaced apart from longitudinal axis 4 in this exemplary embodiment.

In this exemplary embodiment, moreover high-pressure outputs 9A through 9D designed as cups 9A through 9D are forged onto base body 2 for connecting fuel injectors 101 through 104. In this exemplary embodiment, axes 12A through 12D of high-pressure outputs 9A through 9D intersect longitudinal axis 4, as is illustrated in FIG. 3 by an axis 12A.0 for high-pressure output 9A.

Furthermore, for example, at least one connector may additionally be formed at the base body by forging, which may be used, for example, for connecting a pressure sensor. Moreover, an axial high-pressure input 17 is formed at tubular part 3.

For the description of the design and functionality, directions $X_1$, $X_2$, $X_3$ corresponding to a right-handed triad (right-handed system of three coordinates) may be established. Direction $X_1$ is oriented along longitudinal axis 4 in the process. Direction $X_2$ points from longitudinal axis 4 of tubular base body 2 onto a cylinder head 18 of an internal combustion engine 19 when fluid distributor 1 is mounted. Axes 7A, 7B, 7C of holding elements 5A, 5B, 5C as well as axes 12A through 12D of high-pressure outputs 9A through 9D are oriented parallel to one another and along direction $X_2$ in this exemplary embodiment. The establishment of directions $X_1$ and $X_2$ then results in the orientation of direction $X_3$, which is thus parallel to an upper side 20 of cylinder head 18 when fluid distributor 1 is mounted. The attachment of fluid distributor 1 at cylinder head 18 is schematically illustrated by fastening elements (screws) 30A, 30B, 30C, which each engage one of holding elements 5A, 5B, 5C and are oriented along axes 7A, 7B, 7C.

Internal combustion engine 19 includes four cylinders 21A through 21D. In this way, a distance 24 is predefined between axis 12A of high-pressure output 9A and axis 12B of high-pressure output 9B, or between axis 12B of high-pressure output 9B and axis 12C of high-pressure output 9C, or between axis 12C of high-pressure output 9C and axis 12D of high-pressure output 9D, which in this exemplary embodiment is a cylinder distance 24.

In the mounted state, valves 101 through 104 in this exemplary embodiment are supported at cylinder head 18 in direction $X_2$. In this exemplary embodiment, reaction forces occur during operation, in particular due to the hydraulic pressure, which act on valves 101 through 104 counter to direction $X_2$, so that elastic deformations of tubular base body 2 with respect to longitudinal axis 4 occur. Specifically, displacements of high-pressure outputs 9A through 9D in and counter to direction $X_2$ may arise in the process, which apply a load onto the corresponding sealing areas with respect to valves 101 through 104.

The three holding elements 5A, 5B, 5C are arranged at tubular base body 2 in such a way that a sufficient attachment is made possible using only three holding elements 5A, 5B, 5C, without resulting in an overloading of the seals. In addition to the orientation of axes 7A, 7B, 7C of holding elements 5A, 5B, 5C along direction $X_2$, the positioning along longitudinal axis 4 of tubular base body 2 is essential in the process.

In this exemplary embodiment, a first distance 28 results between axis 12A of high-pressure output 9A and axis 7A of holding element 5A, as viewed along longitudinal axis 4. Accordingly, a second distance 29 results between axis 12D of high-pressure output 9D and axis 7B of holding element 5B. In a modified embodiment, it is also possible that at least one of distances 28, 29 at least essentially disappears, so that axis 7A is at least essentially situated at axis 12A and/or axis 7B is at least essentially situated at axis 12D, as viewed along longitudinal axis 4.

In this exemplary embodiment, however, first distance 28 and second distance 29 are predefined as greater than zero. In this case, axis 7A of holding element 5A, as viewed from axis 12A of high-pressure output 9A, is always situated in direction $X_1$, while axis 7B of holding element 5B, as viewed from axis 12D of high-pressure output 9D, is always situated counter to direction $X_1$. In the process, first distance 28 is no more than 0.5 times the predefined distance (cylinder distance) 24. Second distance 29 furthermore also is no more than 0.5 times the predefined distance 24. First distance 28 and second distance 29 are not necessarily selected to be identical. First distance 28 and/or second distance 29 is/are each preferably predefined with a positive value, in particular in each case at least 0.1 times the predefined distance 24 being predefined. Furthermore, first distance 28 and/or second distance 29 is/are each preferably predefined with a value which is no more than 0.4 times the predefined distance 24.

Further parameters result along direction $X_3$ for the possible arrangement of holding elements 5A, 5B. Holding elements 5A, 5B and axes 7A, 7B are preferably situated on the same side of longitudinal axis 4 with respect to direction $X_3$. Furthermore, holding element 5C and axis 7C are then preferably situated on the other side of longitudinal axis 4 with respect to direction $X_3$, so that, on the one hand, holding elements 5A, 5B and, on the other hand, holding element 5C, are situated on different sides of longitudinal axis 4. In a modified embodiment, it is advantageous in any case when in each case two of holding elements 5A through 5C are situated on the one side, and the other holding element is situated on the other side of longitudinal axis 4, with respect to direction $X_3$. Furthermore, distances 35, 36, 37 between axis 7A and longitudinal axis 4, and axis 7B and longitudinal axis 4, and axis 7C and longitudinal axis 4, are preferably minimized with respect to at least one required wall thickness, in particular, a wall thickness of tubular base body 2. However, a different distance 37 may also be specifically predefined for holding element 5C than for holding elements 5A, 5B, in particular also a larger distance than the minimum required distance. It is also conceivable that different, and not necessarily minimum, distances 35, 36 are predefined for holding elements 5A, 5B.

In this exemplary embodiment, axis 7C of third holding element 5C is at least approximately centrally situated between axis 12B of high-pressure output 9B and axis 12C of high-pressure output 9C, as viewed along longitudinal axis 4, i.e., positioned at least approximately spaced 0.5 times the predefined distance 24 apart from axis 12B of high-pressure output 9B in first direction $X_1$. A distance 31 between axis 12B of high-pressure output 9B and axis 7C of third holding element 5C, as viewed along longitudinal axis 4 or along direction $X_1$, is then at least approximately identical to 0.5 times the predefined distance 24.

The positioning of third holding element 5C, however, may also be situated in a different location between axis 12B of high-pressure output 9B and axis 12C of high-pressure output 9C. Such an arrangement may, for example, be established by taking supplementary boundary conditions into consideration. For example, the available installation space in the engine compartment of an internal combustion engine may predefine restrictions in this regard. It is then advantageous when axis 7C of third holding element 5C is positioned spaced at least 0.1 times the predefined distance 24 apart from axis 12B of high-pressure output 9B in first direction $X_1$ and/or when axis 7C of third holding element 5C is positioned spaced no more than 0.9 times the predefined distance 24 apart from axis 12B of second high-pressure output 9B in first direction $X_1$ (and thus spaced at least 0.1 times the predefined distance 24 apart from axis 12C of high-pressure output 9C counter to first direction $X_1$). In the process, it is further preferred when the arrangement takes place as centrally as possible. It is thus particularly advantageous when axis 7C of holding element 5C is positioned spaced at least 0.25 times the predefined distance 24 apart from axis 12B of high-pressure output 9B in first direction $X_1$ and/or when axis 7C of holding element 5C is positioned spaced no more than 0.75 times the predefined distance 24 apart from axis 12B of high-pressure output 9B in first direction $X_1$ (and thus spaced at least 0.25 times the predefined distance 24 apart from axis 12C of high-pressure output 9C counter to first direction $X_1$).

Axes 7A, 7B, 7C of holding elements 5A, 5B, 5C are preferably positioned along longitudinal axis 4 in such a way that the deformations of tubular base body 2 occurring during operation cause maximum displacements of high-pressure outputs 9A through 9D in and counter to direction $X_2$, which are evened out, in particular, to be at least approximately of identical magnitude in terms of absolute value. In this way, comparable loads occur at the sealing areas with valves 101 through 104. In contrast to an embodiment in which such an evening out does not take place, the evened-out load is then lower than the largest individual load.

The embodiment selected in the specific individual case, however, may also be established with reference to further boundary conditions. In particular, it is thus also advantageous to positively predefine distances 28, 29 in order to avoid mass accumulations along longitudinal axis 4, which favorably affects the required material use during forging. Furthermore, the design of tubular base body 2 does not necessarily have to be symmetrical. For example, one of distances 28, 29 may also be 0.3 times the predefined distance 24, while the other is 0.2 times the predefined distance 24. In this way, for example, eccentrically situated high-pressure outputs 9A through 9D, which are thus situated with their axes 12A through 12D offset from longitudinal axis 4 with respect to direction $X_3$ by an axial offset (radial cup offset) 40, as is shown by way of example in FIG. 3, may be compensated for.

When such a positive, i.e., different from zero, axial offset 40 is predefined, as is shown in FIG. 3, it is oriented, with respect to direction $X_3$, toward the side of longitudinal axis 4 on which two of three holding elements 5A through 5C are situated. Proceeding from an arrangement of holding elements 5A through 5C, as it is shown in FIGS. 1 and 2, for a modified embodiment having a positive axial offset 40 shown here, this axial offset 40 is thus oriented counter to direction $X_3$, as viewed from longitudinal axis 4. For illustration, axis 12A in FIG. 3 is denoted by 12A.0 in the case of a vanishing axial offset 40, and axis 12A is denoted accordingly by 12A.1 in the case of a positive axial offset 40.

Longitudinal axis 4 and/or axes 7A through 7C of holding elements 5A through 5C and/or axes 12A through 12D of high-pressure outputs 9A through 9D may, in particular, be determined as borehole axes of suitable boreholes.

Due to the lower number of holding elements 5A, 5B, 5C compared to a conventional design, i.e., only three holding elements 5A, 5B, 5C in the case of four cylinders 21A through 21D, fluid distributor 1 requires less installation space and may be designed to be more lightweight. The lower material use may result in a considerable reduction of the manufacturing costs. On the one hand, the amount of the required bar stock may be reduced. On the other hand, process energy for heating the bar up to the forging temperature may be saved, in particular, in the case of a forged design.

The present invention is not limited to the described exemplary embodiments.

What is claimed is:

1. A fluid distributor for an injection system, comprising:
    a tubular base body processed by a one-stage or multi-stage forging process;
    a first high-pressure output, a second high-pressure output, a third high-pressure output, and a fourth high-pressure output provided at the base body, the second high-pressure output being situated offset by a predefined distance compared to the first high-pressure output in a first direction along a longitudinal axis of the tubular base body, the third high-pressure output being situated offset by the predefined distance compared to the second high-pressure output in the first direction along the longitudinal axis, and the fourth high-pressure output being situated offset by the predefined distance compared to the third high-pressure output in the first direction along the longitudinal axis; and
    a first holding element, a second holding element, and a third holding element, which are configured for an at least indirect attachment of the base body, and being provided at the base body, the first holding element and the second holding element being situated at the tubular base body so that, as viewed along the longitudinal axis, an axis of the first holding element is positioned spaced no more than 0.5 times the predefined distance apart from an axis of the first high-pressure output in the first direction, and that, as viewed along the longitudinal axes, an axis of the second holding element is positioned spaced no more than 0.5 times the predefined distance apart from an axis of the fourth high-pressure output counter to the first direction;
    wherein the first holding element and a first axis, and the second holding element and a second axis are situated on a same side of the longitudinal axis with respect to a third direction,
    wherein the third holding element and a third axis are situated on the other side of the longitudinal axis with respect to the third direction, so that the first holding element and the second holding element are situated on different sides of the longitudinal axis with respect to the third holding element.

2. The fuel distributor as recited in claim 1, wherein the fuel distributor is a fuel distributor rail for a fuel injection system for a mixture-compressing spark ignition internal combustion engine.

3. The fluid distributor as recited in claim 1, wherein the axis of the first high-pressure output, an axis of the second high-pressure output, an axis of the third high-pressure output, the axis of the fourth high-pressure output, the axis of the first holding element, the axis of the second holding element, and an axis of the third holding element, are oriented along a second direction, which is perpendicular to the first direction.

4. The fluid distributor as recited in claim 3, wherein a third direction is both perpendicular to the first direction and perpendicular to the second direction, both the axis of the first holding element and the axis of the second holding element being positioned either in or counter to the third direction with respect to the longitudinal axis, as viewed along the third direction, and the axis of the first holding element and the axis of the third holding element being positioned in and counter to or counter to and in the direction, with respect to the longitudinal axis, as viewed along the third direction.

5. The fluid distributor as recited in claim 4, wherein a distance between the axis of the first holding element and the longitudinal axis along the third direction is less than the predefined distance, and/or a distance between the axis of the second holding element and the longitudinal axis along the third direction is less than the predefined distance, and/or a distance between the axis of the third holding element and the longitudinal axis along the third direction is less than the predefined distance.

6. The fluid distributor as recited in claim 3, wherein the axis of the first holding element, the axis of the second holding element, and the axis of the third holding element are positioned along the longitudinal axis and are further configured for an at least indirect attachment of the base body to an internal combustion engine.

7. The fluid distributor as recited in claim 1, wherein the first holding element and the second holding element are situated at the tubular base body so that, as viewed along the longitudinal axis, the axis of the first holding element is positioned spaced no more than 0.4 times the predefined distance apart from the axis of the first high-pressure output in the first direction and/or, as viewed along the longitudinal axis, the axis of the second holding element is positioned spaced no more than 0.4 times the predefined distance apart from the axis of the fourth high-pressure output counter to the first direction.

8. The fluid distributor as recited in claim 1, wherein the first holding element and the second holding element are situated at the tubular base body so that, as viewed along the longitudinal axis, the axis of the first holding element is positioned spaced at least 0.1 times the predefined distance apart from the axis of the first high-pressure output in the first direction and/or the axis of the second holding element is positioned spaced at least 0.1 times the predefined distance apart from the axis of the fourth high-pressure output counter to the first direction.

9. The fluid distributor as recited in claim 1, wherein an axis of the third holding element, as viewed along the longitudinal axis, is positioned spaced at least 0.1 times the predefined distance apart from the axis of the second high-pressure output in the first direction and/or an axis of the third holding element, as viewed along the longitudinal axis, is positioned spaced no more than 0.9 times the predefined distance apart from the axis of the second high-pressure output in the first direction, and/or an axis of the third holding element, as viewed along the longitudinal axis, is positioned spaced at least 0.25 times the predefined distance apart from the axis of the second high-pressure output in the first direction, and/or an axis of the third holding element, as viewed along the longitudinal axis, is positioned spaced no more than 0.75 times the predefined distance apart from the axis of the second high-pressure output in the first direction, and/or an axis of the third holding element, as viewed along the longitudinal axis, is positioned spaced at least approximately 0.5 times the predefined distance apart from the axis of the second high-pressure output in the first direction.

10. The fluid distributor as recited in claim 1, wherein the first holding element, the second holding element, and the third holding element, are processed with the tubular base body by the one-stage or multi-stage forging process and/or the first high-pressure output, the second high-pressure output, the third high-pressure output, and the fourth high-pressure output are processed with the tubular base body by the one-stage or multi-stage forging process.

11. The fluid distributor as recited in claim 1, wherein at least the tubular base body is formed of a corrosion-resistant stainless steel having a material number 1.4301 or 1.4307 or 1.4462 or 1.4362, and/or the tubular base body includes at least the first high-pressure output, the second high-pressure output, the third high-pressure output, and the fourth high-pressure output and/or the first holding element, the second holding element, and the third holding element is formed of a stainless steel, and/or, with the first holding element, the second holding element, and the third holding element, exactly three holding elements are provided at the tubular base body, which are used for the at least indirect attachment, at a cylinder head and/or, with the first high-pressure output, the second high-pressure output, the third high-pressure output, and the fourth high-pressure output, exactly four high-pressure outputs are provided at the tubular base body, which are used for directly connecting valves.

12. An injection system, comprising:
at least one fluid distributor, including:
a tubular base body processed by a one-stage or multi-stage forging process,
a first high-pressure output, a second high-pressure output, a third high-pressure output, and a fourth high-pressure output provided at the base body, the second high-pressure output being situated offset by a predefined distance compared to the first high-pressure output in a first direction along a longitudinal axis of the tubular base body, the third high-pressure output being situated offset by the predefined distance compared to the second high-pressure output in the first direction along the longitudinal axis, and the fourth high-pressure output being situated offset by the predefined distance compared to the third high-pressure output in the first direction along the longitudinal axis, and
a first holding element, a second holding element, and a third holding element, which are configured for an at least indirect attachment of the base body, and being provided at the base body, the first holding element and the second holding element being situated at the tubular base body so that, as viewed along the longitudinal axis, an axis of the first holding element is positioned spaced no more than 0.5 times the predefined distance apart from an axis of the first high-pressure output in the first direction, and that, as viewed along the longitudinal axes, an axis of the second holding element is positioned spaced no more than 0.5 times the predefined distance apart from an axis of the fourth high-pressure output counter to the first direction;
wherein the first holding element and a first axis, and the second holding element and a second axis are situated on a same side of the longitudinal axis with respect to a third direction,
wherein the third holding element and a third axis are situated on the other side of the longitudinal axis with respect to the third direction, so that the first holding element and the second holding element are situated on different sides of the longitudinal axis with respect to the third holding element.

13. The injection system as recite in claim 12, wherein the injection system is a fuel injection system for a mixture-compressing, spark ignition internal combustion engine.

\* \* \* \* \*